Figure 1:
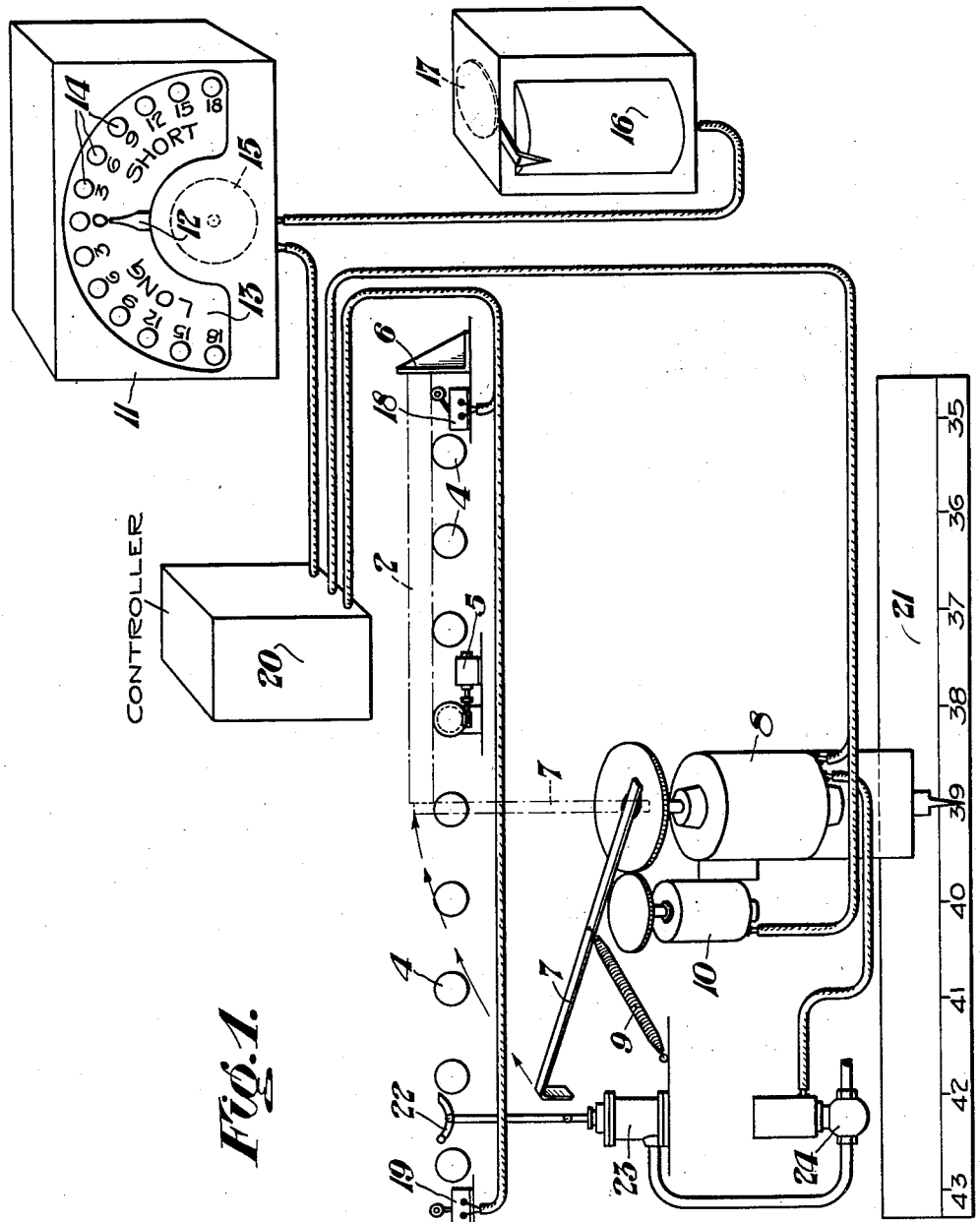

Oct. 6, 1936.  C. L. BRISTOL ET AL  2,056,918
MEASURING DEVICE
Original Filed March 6, 1934   2 Sheets-Sheet 1

Inventors:
CHESTER L. BRISTOL and
WILLIAM C. CHANCELLOR.
by: Usina & Rauber
their Attorneys

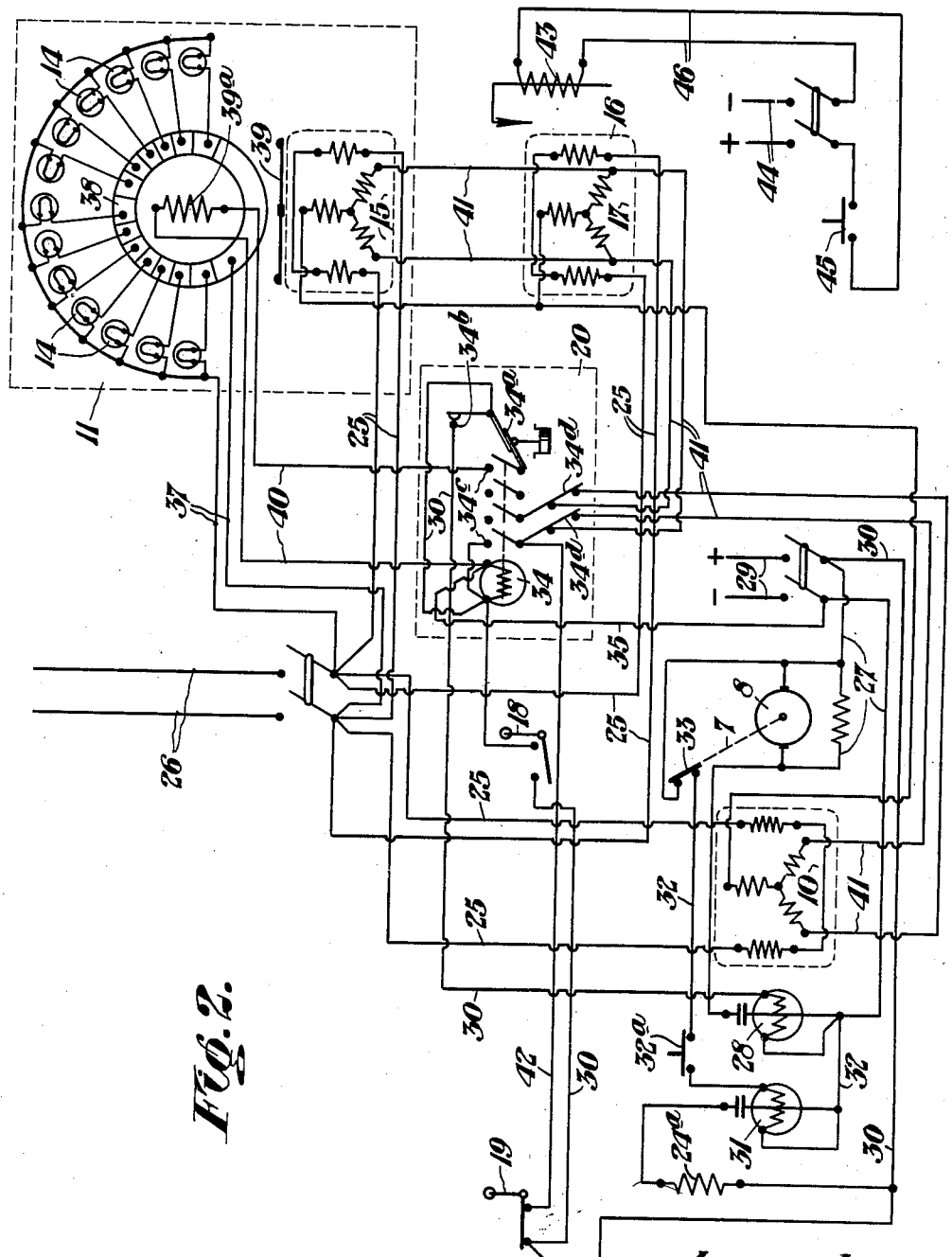

Patented Oct. 6, 1936

2,056,918

UNITED STATES PATENT OFFICE 2,056,918

MEASURING DEVICE

Chester L. Bristol and William C. Chancellor, Elyria, Ohio, assignors to National Tube Company, a corporation of New Jersey Original application March 6, 1934, Serial No. 714,324. Divided and this application September 23, 1935, Serial No. 41,832

7 Claims. (Cl. 80—44)

This invention is a division from our copending application entitled "Manufacture of tubes", filed March 6, 1934 and bearing Serial No. 714,324, and relates to the manufacture of tubular articles, particularly seamless tubes, one of the objects being to produce an apparatus for measuring the lengths of tubes. Other objects may be inferred.

Maintenance of the wall thickness specified by the purchaser of an order of tubes ordinarily depends entirely upon the experience and skill of the roller. It is not practical to measure the thickness of the walls of the hot tubes, and the roller usually depends upon his personal experience. Thus, he knows that billets of certain sizes require a certain amount of working when certain temperatures prevail throughout the process. He depends on his intuition to judge these various factors. It is obvious that many off-gage tubes must be discarded, or reserved for another possible customer who, it is hoped, will specify a wall thickness which can be met by these discards.

Now among the factors that are known by the tube manufacturers are the volume of the metal billets which are to be rolled into the tubes, and the wall thickness demanded by the purchaser. The present method of rolling includes calculating the theoretical length of a tube of this desired wall thickness which has a volume equal to that of the billet from which the tube is to be rolled. This is ordinarily a rather simple mathematical problem. The billet is then formed into a tube in the usual manner, excepting that the roller takes care to see that the tube is elongated to this theoretical length. He does not have to depend upon his experience or intuition which are not always accurate because of the many variables to be figured.

There may be times when it is desirable to produce a tube of a certain wall thickness during the intermediate stages of its manufacture. This can also be done simply by figuring from the volume of the metal before it is rolled the length it should have when its wall thickness is that desired. The roller then merely takes care to see that he produces a tube which is of this length.

Due to the limitations of rolling mills at the present time, it is not always practical to hold the roller exactly to this theoretical length. Since the manufacturer's specification usually includes some tolerance, this is not necessarily a disadvantage. In any event, it is obvious that slight departures from the theoretical length do not affect the wall thickness nearly so much as if these walls were being measured directly.

It is apparent that the method just described may be practiced by manually measuring the length of the tubes as they are being rolled so that the roller will know the number of passes necessary to attain the desired wall thickness. At the present time, there are no mills equipped with any means for doing this otherwise. Therefore, the present invention is further characterized in that it provides for the elimination of such manual measuring operations.

Referring to the accompanying drawings, Figure 1 schematically illustrates an example of an apparatus embodying the features of the invention, and Figure 2 diagrammatically illustrates an electrical system adapted to this particular example. A longitudinal rolling mill 1 is shown working a pierced billet 2 over a mandrel 3. A table 4 of the roller-conveyer type is arranged to receive tubes rolled by this mill. This table is powered by a reversing motor 5 so that tubes may be returned to the mill 1 if desired. Such an arrangement may follow the conventional practice.

According to the invention, this table 4 is provided with a fixed bumper 6 for stopping tubes carried by the table 4 at a thus predetermined position. A feeler 7 is arranged to move from a position where it is free from the path of tubes carried by the table 4 into contact with the tube 2 when so stopped, this feeler consisting of a swinging arm turned by a motor 8 and provided with a returning spring 9. A selsyn transmitter 10 is geared to the motor 8 so as to turn in proportion to the movement of the feeler 7. A measurement indicator 11 is arranged so as to be seen by the roller operating the mill 1. This indicator may include a hand 12 which plays over a dial 13 marked in increments of 3 inches plus-and-minus. Each of these is marked by an electric lamp 14 so as to be more clearly seen by the roller.

This indicator 11 is driven by a selsyn receiver 15 that is connected to the transmitter 10. A recorder 16 may also be provided, a second selsyn receiver 17 being arranged to drive the same. This recorder may be of the type which records the movements of the hand 12 on a chart.

A limit switch 18 is arranged near the bumper 6 and operates to start the motor 8. A second limit switch 19 is arranged near the entrance of the table 4 and functions to reset various elements in a controller box 20. This box contains a time delay apparatus which operates the indicator 11 and recorder 16, a short time after the motor 8 has been started by the switch 18. This controller also functions to deenergize the motor 8 so that the feeler 7 returns to its starting position.

The operation of the above as thus briefly described is as follows:

The roller is working the tube 2 through the mill 1. The indicator 11 has been set so that its hand 12 is at the zero mark on the plus-and-minus scale 13 when the transmitter 10 has been rotated by the motor 8 a sufficient distance to bring the feeler 7 to a position where it would contact tubes of the theoretical length which the tube 2 must have when it has the certain wall thickness desired.

As the tube 2 leaves the rolling mill 1 it is carried by the table 4, the latter returning it through the mill for another pass, if required. Each time the tube passes over the table 4 it is stopped by the bumper 6. Also, it operates the switch 18 so that the motor 8 starts and continues to run until its feeler 7 strikes the rear end of the tube. The controller 20 then functions to operate the indicator 11 and recorder 16. When this indicator approaches zero or starts to read long, the roller knows that he has come as far as he possibly can to the theoretical length and therefore to the desired wall thickness. The recorder 16 can be used to show the number of passes required, and may thus be used as a general indication of the efficiency of the rolling operation. When the tube leaves the table 4, the indicator 11 continues to read the length of the tube. When the tube again returns it operates the switch 19 which resets the apparatus in the controller 20 so that a new reading may be obtained.

The various details shown by the drawings and not heretofore mentioned will now be described.

The motor 8 and selsyn transmitter 10 are preferably mounted for sliding movement along a scale 21. This scale 21 is graduated in terms of feet, and the motor and transmitter may be slid therealong and locked into registration with the graduation agreeing with the theoretical length of the tube. Also, the table 4 is provided with a throw-out arm 22 powered by an air cylinder 23, the latter being controlled by an electromagnetic valve 24. This throw-out arm functions to discharge tubes from the table 4 when the indicator 11 indicates that they are of the proper length.

The fields of the selsyn transmitter 10 and the two selsyn receivers 15 and 17 are powered through lines 25 by A. C. power lines 26. The motor 8 is powered through lines 27 and an electromagnetic switch 28 by D. C. power lines 29. This electromagnetic switch 28 is controlled by the limit switch 18 through lines 30 and 27 by the power lines 29. Thus, when this switch 18 is closed by the tube 2 the electromagnetic switch 28 is operated so that the motor 8 starts.

Solenoid 24ª of the valve 24 is powered through an electromagnetic switch 31 which connects with the lines 30 and 27. This switch 31 is energized through lines 32 which connect into the lines 27 by way of a switch 33 closed by the arm 7. Therefore, when the arm 7 is being operated by the motor 8, this electromagnetic switch 31 cannot operate, which means that the throw-out arm 22 cannot function.

Operation of the limit switch 18 also energizes an electromagnetic switch 34, which constitutes the controller 20, through lines 35. This electromagnetic switch 34 is controlled by a dash-pot 34ª which is regulated to permit operation of this switch a short time after the switch 18 is closed. This time period is sufficient to allow the motor 8 to bring the feeler 7 against the tube 2. When the switch 34 operates it opens contacts 34ᵇ which are interposed in the lines 30, this deenergizing the electromagnetic switch 28 which deenergizes the motor 8 so that the spring 9 can return the feeler 7. Return of this feeler 7 closes the switch 33 so that the electromagnetic switch 31 is energized through a push-button switch 32ª. This permits the operation of the air valve 24 by means of the push-button switch 32ª, this being done when the tube is sufficiently elongated.

Operation of the electromagnetic switch 34 also closes two contacts 34ᶜ. The lamps 14 are all energized through lines 37 and contacting segments 38, and a contactor 39 is rotated by the selsyn receiver 15 and is arranged to span the segments 38 upon energization of an electromagnet 39ª. These contacts 34ᶜ serve to energize this electromagnet 39ª through lines 40. At the same time, contacts 34ᵈ are opened, these contacts being interposed in lines 41 which interconnect the rotors of the various selsyn elements. Therefore, operation of the switch 34 disconnects the receivers 15 and 17 from the transmitter 10 and also energizes the electromagnet 39 so that one of the lamps 14 lights. The contactor 39 functions as a selective element driven by the selsyn receiver 15, so that the proper one of these lamps is lighted to show the length of the tube 2.

When the tube 2 is returned to the mill for further rolling, assuming it has not been elongated sufficiently, or when it is discharged by the throw-out arm 22 after it has been elongated sufficiently, the indicator 11 continues to read. When the switch 19 is opened by the returning tube, or another tube, the circuit through a line 42 is broken. This line 42 has been shunting the energizing current to the electromagnetic switch 34 around the open limit switch 18, by way of one of the contacts 34ᶜ. Therefore, when the circuit is broken through this line 42, the electromagnetic switch 34 is deenergized and the entire apparatus ready to start another measuring cycle.

The recorder 16 may be provided with an electromagnetically operated individual recording means 43 which may be energized by power lines 44 through a push-button switch 45 and lines 46. This individual recording means may consist of one or more type carriers, or the like, bearing numbers or initials for indicating the identity of the operator of the rolling mill.

We claim:

1. An apparatus for measuring the length of elongated work to determine the wall thickness thereof, including a conveyer for carrying said work longitudinally, a fixed bumper for stopping work carried by said conveyer, a feeler arranged to move from a position free from the path of work carried by said conveyer into contact with work so stopped, a rotary motor for moving said feeler, a selsyn transmitter geared to said motor, a measurement indicator and a selsyn receiver connected to said transmitter and driving said indicator.

2. An apparatus for measuring the length of elongated work to determine the wall thickness thereof, including a conveyer for carrying said work longitudinally, a fixed bumper for stopping work carried by said conveyer, a feeler arranged to move from a position free from the path of work carried by said conveyer into contact with work so stopped, a rotary motor for moving said feeler, a selsyn transmitter geared to said motor, a measurement indicator, a selsyn receiver connected to said transmitter and driving said indicator, means operable by the approach of work towards said bumper for energizing said motor, means for deenergizing said motor after an appreciable time interval, a discharger for removing work from said conveyer, and means for operating said discharger when said motor is deenergized.

3. An apparatus for measuring elongated work to determine the wall thickness thereof, including a work conveyer for carrying said work longitudinally, a fixed bumper for stopping work carried by said conveyer, a feeler arranged to move from a position free from the path of work carried by said conveyer into contact with work so stopped, a rotary motor for moving said feeler, a selsyn transmitter geared to said motor, a measurement indicator including a plurality of lamps having a magnetically operated switch for individually lighting the same and which includes a selective element therefor, a selsyn receiver connected to said transmitter and arranged to operate said selective element, means operable by the approach of work toward said bumper for energizing said motor, means for deenergizing said motor after an appreciable time interval and also for energizing said magnetically operated switch and disconnecting said receiver from said transmitter, and means operated by movement of work towards said bumper for deenergizing said magnetically operated switch and connecting said receiver to said transmitter.

4. An apparatus for measuring elongated work to determine the wall thickness thereof, including a work conveyer for carrying said work longitudinally, a fixed bumper for stopping work carried by said conveyer, a feeler arranged to move from a position free from the path of work carried by said conveyer into contact with work so stopped, a motor for moving said feeler, a selsyn transmitter geared to said motor, a measurement indicator including a plurality of lamps having a magnetically operated switch for individually lighting the same and which includes a selective element therefor, a selsyn receiver connected to said transmitter and arranged to operate said selective element, means operable by the approach of work toward said bumper for energizing said motor, means for deenergizing said motor after an appreciable time interval and also energizing said magnetically operated switch and disconnecting said receiver from said transmitter, a discharger for removing work from said conveyer, means for operating said discharger only when said motor is deenergized, a recorder having individual recording means, a selsyn receiver operating said recorder and connected to said transmitter, manually operated means for controlling said individual recording means, and means operated by movement of work towards said bumper for deenergizing said magnetically operated switch and connecting said first named receiver to said transmitter.

5. In the manufacture of tubular articles, of means for determining the wall thickness of said articles by measuring the length thereof, which comprises a conveyer for moving said articles longitudinally, means for stopping said articles after a predetermined distance, a swinging arm adapted to move from a position out of the path of said articles into contact with said articles, a motor for moving said arm, means adapted to indicate the length of a tubular article after each pass and means operated by the travel of said tubular article over the conveyer to energize said motor to operate said length indicating means.

6. In the manufacture of tubular articles, of means for determining the wall thickness of said articles by measuring the length thereof, which comprises a conveyer for moving said articles longitudinally, means for stopping said articles after a predetermined distance, a swinging arm adapted to move from a position out of the path of said articles into contact with said articles, a motor for moving said arm, work discharging means, means adapted to deenergize said motor, means adapted to indicate the length of a tubular article after each pass, means operated by the travel of said tubular article over the conveyer to energize said motor to operate said length indicating means and means responsive to the deenergizing of said motor for operating said discharging means to remove said tubular article from said conveyer when said indicating means indicates said tubular article is the proper length.

7. In the manufacture of tubular articles, of means for determining the wall thickness of said articles by measuring the length thereof, which comprises a conveyer for moving said articles longitudinally, means for stopping said articles after a predetermined distance, a swinging arm adapted to move from a position out of the path of said articles into contact with said articles after said articles have engaged said stop, a motor for moving said arm, means adapted to indicate the length of a tubular article after each pass, means operated by the travel of said tubular article over the conveyer to energize said motor to operate said length indicating means and means responsive to the movement of said tubular article to reset said indicating means.

CHESTER L. BRISTOL.
WILLIAM C. CHANCELLOR.